United States Patent
Tama, Jr. et al.

(10) Patent No.: US 10,528,961 B2
(45) Date of Patent: Jan. 7, 2020

(54) SYSTEM AND METHOD FOR ESTIMATING A MOVE USING OBJECT MEASUREMENTS

(71) Applicant: Virtual Moving Technologies, Rotterdam, NY (US)

(72) Inventors: Thomas A. Tama, Jr., Scotia, NY (US); Christopher J. Ramsey, Guilderland, NY (US); Wayne H. Fitzgerald, Rotterdam, NY (US)

(73) Assignee: Virtual Moving Technologies, Rotterdam, NY (US)

( * ) Notice: Subject to any disclaimer, the term of this patent is extended or adjusted under 35 U.S.C. 154(b) by 807 days.

(21) Appl. No.: 14/826,558

(22) Filed: Aug. 14, 2015

(65) Prior Publication Data

US 2016/0055506 A1 Feb. 25, 2016

Related U.S. Application Data

(60) Provisional application No. 62/039,605, filed on Aug. 20, 2014.

(51) Int. Cl.
*G06Q 10/00* (2012.01)
*G06Q 30/02* (2012.01)
(Continued)

(52) U.S. Cl.
CPC ..... *G06Q 30/0206* (2013.01); *G06K 9/00671* (2013.01); *G06K 9/00771* (2013.01); *G06Q 10/08345* (2013.01); *H04N 5/772* (2013.01)

(58) Field of Classification Search
CPC combination set(s) only.
See application file for complete search history.

(56) References Cited

U.S. PATENT DOCUMENTS

| 2002/0107661 A1 | 8/2002 | Ainlay et al. |
| 2007/0070069 A1 | 3/2007 | Samarasekera et al. |

(Continued)

FOREIGN PATENT DOCUMENTS

| DE | 19836023 A1 | 2/2000 |
| JP | 2001290964 A | 10/2001 |

(Continued)

OTHER PUBLICATIONS

Mustafah,Y.M, "Object Distance and Size Measurement Using Stereo Vision System", Journal, Dec. 27, 2012, p. 1373-1377, vol. No. 622-623, Advanced Materials Research, Switzerland.

(Continued)

*Primary Examiner* — William S Brockington, III
*Assistant Examiner* — Scott M Ross
(74) *Attorney, Agent, or Firm* — Hoffman Warnick LLC (57) ABSTRACT

Embodiments of the present disclosure provide a computer-implemented method for estimating a move, the method comprising: identifying at least one object of interest from a video feed of an environment, wherein the video feed includes coordinate data for three dimensions of space; estimating a plurality of measurements of the at least one object of interest by reference to the coordinate data and the video feed of the environment; generating an inventory of each identified object of interest and corresponding plurality of measurements; and calculating one of an estimated moving time and an estimated moving cost based on the generated inventory.

19 Claims, 6 Drawing Sheets

(51) Int. Cl.
*H04N 5/77* (2006.01)
*G06K 9/00* (2006.01)
*G06Q 10/08* (2012.01)

(56) References Cited

U.S. PATENT DOCUMENTS

| | | | |
|---|---|---|---|
| 2008/0082292 A1 | 4/2008 | Storm | |
| 2011/0082782 A1 | 4/2011 | Komac et al. | |
| 2013/0085782 A1 | 4/2013 | Raviv et al. | |
| 2013/0132295 A1 | 5/2013 | Horowitz et al. | |
| 2014/0074744 A1* | 3/2014 | Ben-Harosh | G06Q 10/083 |
| | | | 705/335 |
| 2014/0121965 A1 | 5/2014 | Kim et al. | |
| 2014/0149306 A1 | 5/2014 | Olsen | |
| 2015/0228028 A1 | 8/2015 | Friedman | |

FOREIGN PATENT DOCUMENTS

| | | |
|---|---|---|
| JP | 2002117278 A | 4/2002 |
| JP | 2005056213 A | 3/2005 |
| JP | 2005227805 A | 8/2005 |
| JP | 2005266904 A | 9/2005 |
| JP | 2008033819 A | 2/2008 |
| JP | 2009069996 A | 4/2009 |
| JP | 2013082009 A | 5/2013 |
| JP | 2013187905 A | 9/2013 |
| JP | 2013214127 A | 10/2013 |
| JP | 2014002605 A | 1/2014 |
| WO | 2011053328 A1 | 5/2011 |

OTHER PUBLICATIONS

EP Search Report and Opinion issued in connection with corresponding EP Application No. 15833067 dated Jun. 26, 2017, 2 pages.

Patent Cooperation Treaty, Notification of Transmittal of the International Search Report and the Written Opinion of the International Searching Authority, or the Declaration for PCT/US2015/045607 dated Nov. 24, 2015, 11 pages.

JP Office Action for Japanese Patent Application No. 2017-529590, 3 pages.

* cited by examiner

SYSTEM AND METHOD FOR ESTIMATING A MOVE USING OBJECT MEASUREMENTS

BACKGROUND OF THE INVENTION

This disclosure relates generally to systems and methods for estimating a move using measurements of one or more objects. More specifically, the present disclosure relates to using wearable or non-wearable computers, tablets, cellular phones, and/or similar devices alone or in combination to estimate a moving time and/or cost from the dimensions of objects to be moved from an environment such as a dwelling.

Moving from one dwelling to another, the process of which can be identified and referred to herein as a "move," can be a time-consuming and expensive process regardless of whether it may occur within a remote area or across a longer distance. Many individuals request the assistance of a moving company or other service to transport furniture and/or other items from one dwelling to another to protect valuables from being damaged, successfully move large objects, and save time. Moving companies will typically charge the individual for this assistance based on the number of objects to be moved, the size and/or weight of the moved objects, and the total labor time or mileage distance between the individual's current and future dwellings. One or more representatives of the moving company or service may schedule an in-person visit to a customer's house to count, identify, measure, and/or classify the objects being moved to estimate a time and/or cost for the move.

BRIEF DESCRIPTION OF THE INVENTION

A first aspect of the present disclosure includes a computer-implemented method for estimating a move, the method comprising: identifying at least one object of interest from a video feed of an environment, wherein the video feed includes coordinate data for three dimensions of space; estimating a plurality of measurements of the at least one object of interest by reference to the coordinate data and the video feed of the environment; generating an inventory of each identified object of interest and corresponding plurality of measurements; and calculating one of an estimated moving time and an estimated moving cost based on the generated inventory.

A second aspect of the present disclosure includes a program product stored on a computer-readable medium, the program product being operative to estimate a move when executed and comprising program code for causing a computer system to: identify at least one object of interest from a video feed of an environment, wherein the video feed includes coordinate data for three dimensions of space; estimate a plurality of measurements of the at least one object of interest by reference to the coordinate data and the video feed of the environment; generate an inventory of each identified object of interest and corresponding plurality of measurements; and calculate one of an estimated moving time and an estimated moving cost based on the generated inventory.

A third aspect of the present disclosure includes a system for estimating a move, the system comprising: at least one computing device including: an identifier for identifying at least one object of interest from a video feed of an environment, wherein the video feed includes coordinate data for three dimensions of space; a data processing module for estimating a plurality of measurements of the at least one object of interest by reference to the coordinate data and the video feed of the environment, and generating an inventory of each identified object of interest and corresponding plurality of measurements; and a calculator for calculating one of an estimated moving time and an estimated moving cost based on the generated inventory.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein. The detailed description explains embodiments of the invention, together with advantages and features, by way of example with reference to the drawings.

DETAILED DESCRIPTION OF THE INVENTION

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Embodiments of the present disclosure are directed towards computer-implemented methods for estimating a move, including metrics such as an estimated moving time and an estimated moving cost. As is discussed herein, the method can include identifying at least one object of interest from one or more video feeds of an environment. The video feeds may be recorded or streamed in real-time by a user of the present disclosure or a different party (e.g., a customer). The video feed can include (i.e., be assigned at the time of recording or at a later time) coordinate data for three dimensions of space. For example, the video feed can be converted into and/or mapped onto a simulated three-dimensional model of the environment. In embodiments of the disclosure, one or more computer systems can estimate measurements for each object of interest in the video feed(s) by referring to the coordinate data and attributes of the video feed(s) of the environment. Based on these estimated measurements, the computer system(s) can generate an inventory of each identified object of interest, and the corresponding estimated measurements for each object of the inventory. Using this inventory, the computer system(s) can calculate an estimated moving time or an estimated moving cost based on the generated inventory.

Figure 1:
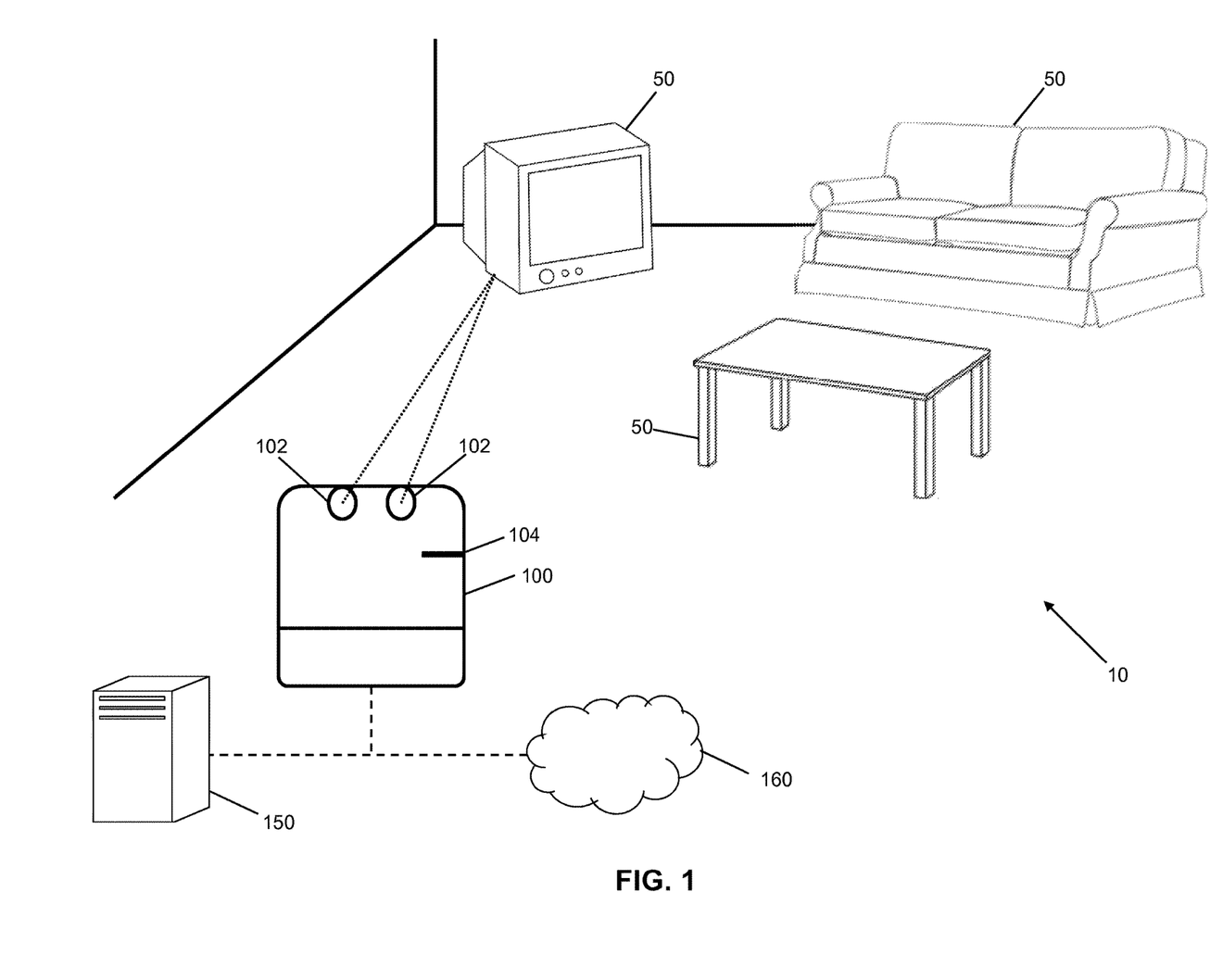
FIG. 1 shows an environment with several objects of interest and a video device according to embodiments of the present disclosure.

Referring to FIG. 1, an environment 10 with several objects of interest 50 is shown. Each object of interest 50 can include an item such as an appliance, piece of furniture, etc., to be moved from environment 10, such as a dwelling, to another location. Objects of interest 50 can have varying shapes, sizes, volumes, weights, etc., such that some objects of interest 50 may require a different amount of time and/or money to be moved from environment 10 during the move. Embodiments of the present disclosure can scan and estimate various attributes for one object of interest 50, and can provide the same functionality for several objects of interest 50 in the same environment 10.

Methods of the present disclosure can process recorded and/or streaming videos (referred to collectively herein as a "video feed" or "video feeds") created, obtained, processed, etc. by a video device 100. Video device 100 can include any device or group of devices for assigning coordinate data for three dimensions of space to a video feed. The coordinate data can be in the form of a vector-format data field. Although example herein refer to video device 100 as also being a mechanism for assigning coordinate data to one or more video feeds, it is understood that alternative embodiments can include other devices for adding and/or assigning coordinates to predetermined video feeds. A vector-format data field refers to a single item of data with multiple values contained therein, which in embodiments of the present disclosure can refer to different coordinates along three axes (X, Y, Z, etc.). Video device 100 can include or be embodied as a part of a computing device such as a laptop computer, a video camera, a phone, a tablet computer, a personal computer, a wearable or non-wearable computing device, etc. In an embodiment, video device 100 can include one or more cameras 102, which together can make up a three-dimensional ("3D") camera with multiple lenses configured to interface with software for assigning coordinates onto video feeds and/or generating a simulated 3D model of environment 10, e.g., by triangulating the position of pixels in each video feed over a shared timeline. Although two cameras 102 are shown in FIG. 1 as an example, it is understood that four, six, eight, ten, or any conceivable number of cameras 102 can be used to map coordinates onto a single video feed from multiple cameras 102.

In an alternative embodiment, video device 100 can include 3D mapping software for assigning three-dimensional coordinates to environment 10 and/or generating a three-dimensional model of environment 10. A 3D mapping process can include, e.g., collecting positional information from video device 100 over time to assign coordinates to environment 10. The assigned coordinates can be used to identify the position and orientation of video device 100, whether or not a video feed is being streamed and/or recorded. Video device 100 can organize data collected and calculated with 3D mapping software to assign coordinates onto a video feed of environment 10 and/or 3D representation thereof. The assigned coordinates can include coordinates for video device 100 at a particular point in time and/or coordinates for each object of interest 50 included in the video feed of environment 10.

Embodiments of the present disclosure can include identifying one or more objects of interest 50 from the video feed. The objects can be identified by an object recognition algorithm stored within video device 100 or another computing device in communication with video device 100 which receives the video feed of environment 10. An object recognition algorithm can extract particular objects from a video feed, by, e.g., comparing the position of an object against reference coordinates for environment 10, referring to predetermined combinations of shapes, objects, colors, sizes, etc., receiving instructions from a local or remote user, detecting vocal inputs provided to a microphone 104 of video device 100 through voice recognition software, and/or any combination of these techniques or other techniques. In addition, the same object recognition algorithm and/or different algorithms can remove some objects of interest 50 from the video feed, e.g., by virtue of having a size outside of a predetermined threshold and/or being categorized as an intermediate element such as a wall, floor, etc. Example processes for identifying, modeling, and/or removing items within or from a representation of environment 10 are described herein. In any case, the process steps for identifying objects of interest 50 can be performed entirely by software and/or hardware of video device 100, a remote server 150 in communication with video device 100 or which receives the video feed, a cloud computing system 160 composed of several individual systems each partially responsible for identifying objects from the video feed, and/or by a combination of these components or other devices.

Video device 100 may identify one or more objects of interest 50 within environment 10. Embodiments of the present disclosure can provide estimated measurements, including dimensions, for each identified object of interest 50. Specifically, software and/or hardware can refer to the coordinate data associated with each object of interest 50 in environment 10, in addition to the video feed itself, to estimate one or more measurements of each identified object of interest 50. As examples, embodiments of the present disclosure can estimate measurements along a single dimension, a volume of object of interest 50, a mass density of object of interest 50, and/or other metrics which can be derived wholly or partially from the video feed and/or the assigned coordinates. Embodiments of the present disclosure can also apply one or more predetermined weighting factors to calculate properties such as volume and/or weight of particular objects of interest 50. In one example, video device 100 can pair the coordinates for object of with predetermined coordinates for environment 10. In another example, object detection software of video device 100 can map coordinates directly onto detected objects of interest 50 based on the position of video device 100 and/or an evaluated displacement of object of interest 50 from video device 100. Other currently known or later developed devices and/or solutions for mapping coordinates to a remote object from a video, e.g., interferometry, non-contact laser-scanning vibrometry, and/or stroboscopic techniques are also contemplated.

After detecting one or more objects of interest 50 and/or estimating measurements for each object of interest 50, methods of the present disclosure can include generating an inventory of each identified object of interest 50 and the corresponding estimated measurements. Objects of interest 50 in the generated inventory can be ranked or organized by any number of desired criteria, including without limitation, objects of similar size and/or type, ascending or descending order of volume, density, etc., order of detection, proximity to video device 100 from which the video feed is obtained, etc. The generated inventory can be provided to any number of parties, including the user responsible for creating the video feed, a moving services company, a cost estimator, another servicer, etc. The various process steps and/or features discussed herein can be carried out by or with the aid of software and/or hardware, particularly through one or more computing devices, as is discussed herein.

Figure 2:
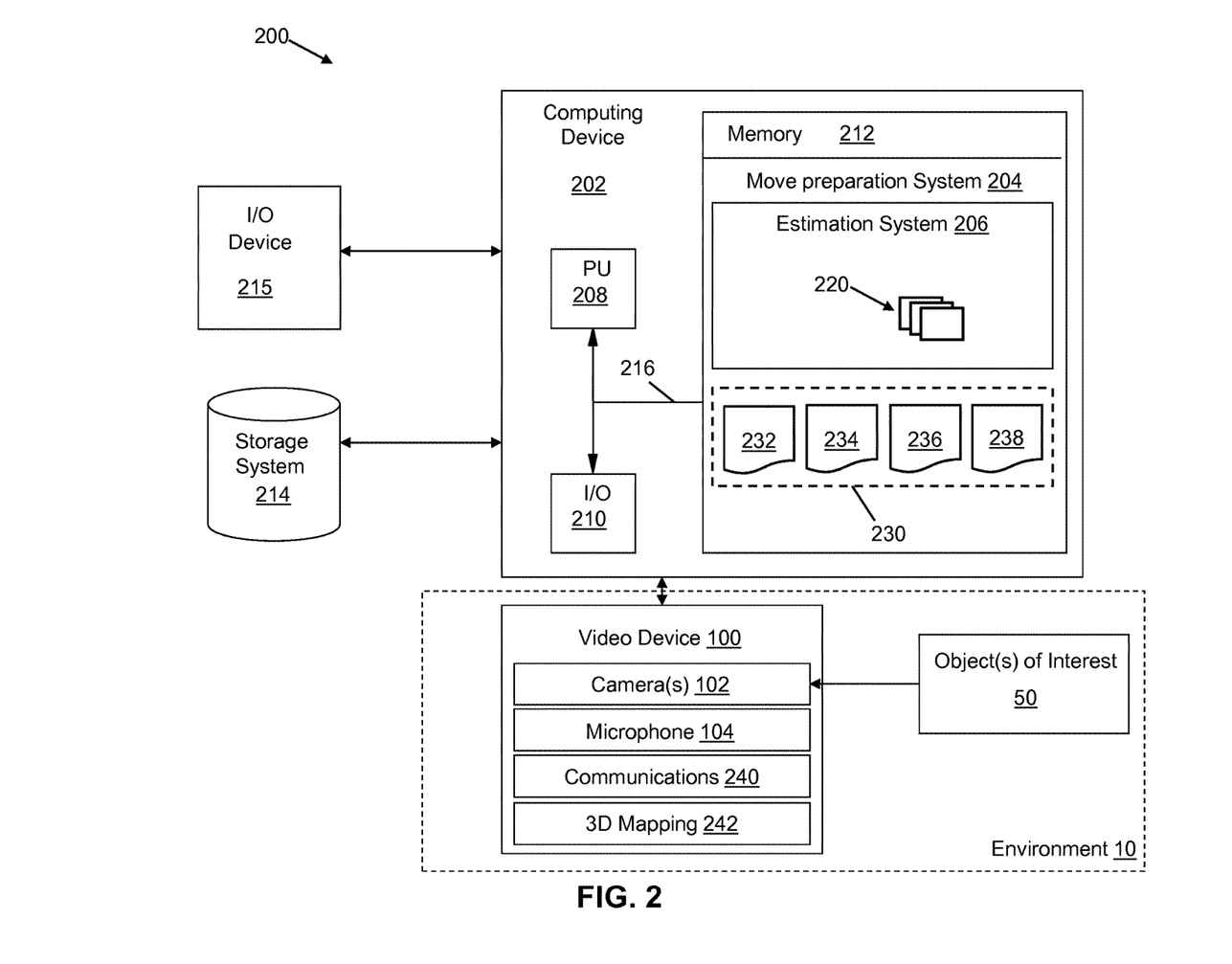
FIG. 2 shows an illustrative computer system according to embodiments of the present disclosure.

Turning to FIG. 2, a computer system 200 can be in communication with video device 100. Computer system 200 can include hardware and/or software for carrying out process steps discussed herein for processing one or more video feeds stored locally or received from another system, e.g., from video device 100. Computer system 200 can scan objects in an environment by identifying objects of interest from a video feed, estimating measurements for each object of interest, and generating an inventory of the measured and identified objects of interest. In addition or alternatively, computer system 200 can provide instructions to assign three-dimensional coordinates to the video feed(s) being analyzed. Computer system 200 can be communicatively coupled to video device 100 to send and receive a video feed which includes object(s) of interest 50. Computer system 200 can more particularly receive output data from video device 100 and perform method steps and/or processes described in detail herein. Computer system 200 can therefore interact with video device 100 and/or other devices which include a video feed which shows one or more objects of interest.

In FIG. 2, an illustrative embodiment of computer system 200 for performing embodiments of the processes described herein is shown. In particular, computer system 200 can include a move preparation system 204, which in turn can include an estimation system 206. The components shown in FIG. 1 are one embodiment of a system for planning a move. As discussed herein, computing device 202 can predict attributes of a planned move, such as the time and cost of moving a particular group of items, based on one or more video feeds and/or coordinates mapped onto the one or more video feeds. Embodiments of the present disclosure may be configured or operated in part by a technician, computing device 202, and/or a combination of a technician and computing device 202. It is understood that some of the various components shown in FIG. 2 can be implemented independently, combined, and/or stored in memory for one or more separate computing devices that are included in computing device 202. Further, it is understood that some of the components and/or functionality may not be implemented, or additional schemas and/or functionality may be included as part of estimation system 206.

Computing device 202 can include a processor unit (PU) 208, an input/output (I/O) interface 210, a memory 212, and a bus 216. Further, computing device 202 is shown in communication with an external I/O device 215 and a storage system 214. Move preparation system 204 can execute object estimation system 206, which in turn can include various software components, including modules 220, configured to perform different actions. The various modules 220 of estimation system 206 can use algorithm-based calculations, look up tables, and similar tools stored in memory 212 for processing, analyzing, and operating on data to perform their respective functions. In general, PU 208 can execute computer program code to run software, such as estimation system 206, which can be stored in memory 212 and/or storage system 214. While executing computer program code, PU 208 can read and/or write data to or from memory 212, storage system 214, and/or I/O interface 210. Bus 216 can provide a communications link between each of the components in computing device 202. I/O device 215 can comprise any device that enables a user to interact with computing device 202 or any device that enables computing device 202 to communicate with the equipment described herein and/or other computing devices. I/O device 215 (including but not limited to keyboards, displays, pointing devices, etc.) can be coupled to computer system 200 either directly or through intervening I/O controllers (not shown).

Memory 212 can also include various forms of data 230 pertaining to a video feed and/or one or more objects of interest. Move preparation system 204 of computing device 202 can store and interact with data 230 in processes of the present disclosure. For example, video data field 232 can temporarily or permanently store video feeds obtained from video device 100 or other devices (e.g., uploaded from storage system 214), which can be examined, processed, modified, etc. with computing device 202 according to embodiments of the present disclosure. Video data field 232 can include a single video feed or a group of several video feeds for the same environment 10, and/or can include several video feeds for several corresponding environments 10. Modules 220 can analyze video feeds of video data field 232 to identify and/or estimate the properties of objects of interest 50 according to method steps discussed herein. Object scanning program can assign coordinate values stored in a coordinate data field 234 to video feeds in video data field 232 based on process steps described herein. Data 230 can also include an object library field 236 with classifications for particular objects of interest 50. Object library field 236 can include, e.g., a list of object classifications and/or measurement criteria (e.g., value ranges) for each classification. Data 230 can also include GPS data 238 and/or another type of location data, which may be historical and/or updated in real-time based on the location of video device 100, computing device 202, and/or any other relevant devices and/or components. It is also understood that other types of permanent and/or transitory data 230 may be stored in various fields not mentioned explicitly herein in embodiments of the present disclosure, as may be desired for particular implementations.

Video device 100 can optionally include a communications module 240 and/or 3D mapping module 242. Although communications module 240 and 3D mapping module 242 are discussed by example herein as being contained within video device 100, e.g., as hardware and/or software, it is understood that the same functionality may be provided within computing device 202 as modules 220 and/or as features offered by other devices of computer system 200. In any case, communications module 240 may allow for a remote user, servicer, and/or other party to transmit visual and/or audio instructions to a user of video device 100. Communications module 240 can allow, e.g., a servicer to verbally instruct a user or other party of how to record and/or stream a video feed to be transmitted to move preparation system 204 of computing device 202. In an illustrative example, a user can create a video feed of environment 10 to be transmitted by the internet to computing device 202, where objects of interest 50 can be identified and measurements thereof can be estimated. A servicer can connect to video device 100 via communications module 240 to place a call or video call to provide real-time instructions to a user for creating the video feed of environment 10. Video device 100 can include/or be in communication with 3D mapping module 242 to track the position of video device 100 within environment 10. 3D mapping module can allow a video device 100 to map coordinate data onto video feeds and/or generate a simulated 3D model of environment 10, e.g., based on a position and/or orientation of video device 100 within a particular environment 10, regardless of whether video device 100 includes one camera 102 or several cameras 102. 3D mapping module 242 can thus be an alternative or additional instrument for assigning coordinate data to video feeds created with video device 100 in embodiments of the present disclosure.

As discussed herein, modules 220 can perform various functions to execute method steps according to embodiments of the present disclosure. Some functions of modules 220 are described herein as non-limiting examples. A comparator module can compare two or more mathematical quantities, including values of coordinate data. A determinator module can select one of at least two alternative steps or outcomes based on other operations performed by object estimation system 206 or other pieces of software and/or hardware. A calculator module can perform mathematical operations. Other modules can perform one or more of the functions described herein as alternatively being performed with other components (e.g., video device 100) including software to support camera(s) 102, microphone 104, and the functions of communications module 240 and/or 3D mapping module 242. Other modules 220 can be added and/or adapted to perform process steps described herein but not associated with a particular module of modules 220.

Computing device 202 can comprise any general purpose computing article of manufacture for executing computer program code installed by a user (e.g., a personal computer, server, handheld device, etc.). However, it is understood that computing device 202 is only representative of various possible equivalent computing devices and/or technicians that may perform the various process steps of the disclosure. In addition, computing device 202 can be part of a larger system architecture for scanning and/or mapping objects of interest 50.

To this extent, in other embodiments, computing device 202 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 202 may include a program product stored on a computer readable storage device, e.g., an application provided on a cellular phone, tablet, and/or other computing device as a hardware or software component thereof, and which can be operative to automatically scan and/or map objects of interest 50 when executed.

Figure 3:
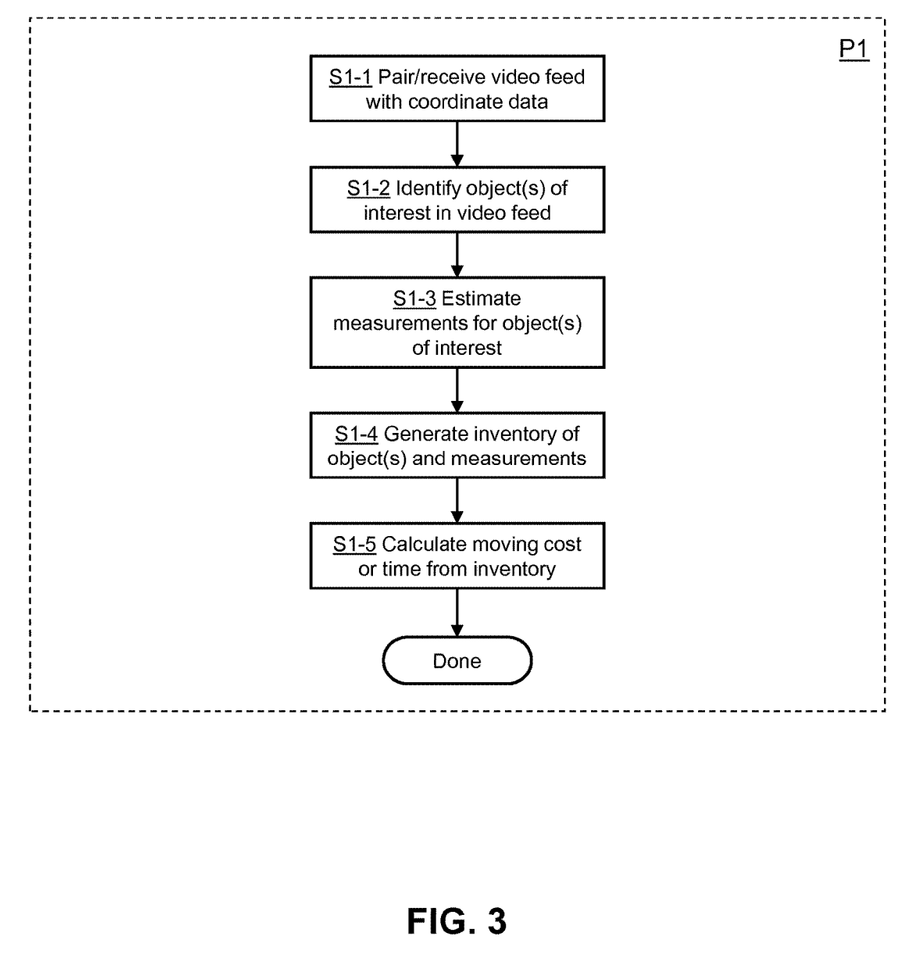
FIGS. 3-6 each show an illustrative flow diagram for implementing methods according to embodiments of the present disclosure.

Referring to FIGS. 2 and 3 together, process steps according to embodiments of the present disclosure are discussed. The various process steps discussed herein can be performed via an embodiment of computer system 200 and/or equivalent systems or components. Process P1 includes several method steps, which in combination can have the technical effect of identifying and estimating measurements for one or more objects of interest 50 from a video feed. Process P1 can include the steps discussed herein, with additional and/or alternative steps. In addition, process P1 can be combined with other processes to be used before and/or after the steps of process P1. As is discussed elsewhere herein, e.g., by reference to FIGS. 5 and 6, each step within process P1 can further be divided into sub-steps in some embodiments of the present disclosure.

In step S1-1, computer system 200 can receive a video feed. The video feed may include a pre-assigned set of three-dimensional coordinates defined in coordinate data field 234 of computer system 200. In some cases, the video feed may be stored in video data field 232 independent of coordinate data field 234, and modules 220 can assign coordinates from coordinate data field 234 to a video feed in video data field 232 during step S1-1. The coordinates associated with the video feed can be obtained from one or more of, e.g., 3D mapping, a 3D camera, and/or object recognition tools.

In step S1-2, modules 220 of computer system 200 can identify the presence of one or more objects of interest 50 in environment 10 from the video feed received and/or paired with coordinate data in step S1-1. Modules 220 can identify objects by any currently known or later developed process, including object recognition tools of object estimation system 206 and/or other components, differences between existing coordinate data for environment 10 and coordinate data for environment 10 with object(s) of interest 50 therein, derivation from multiple video feeds recorded with multiple cameras 102 and/or multiple lenses, voice recognition, or combinations of these processes and/or other processes. Some example processes for identifying objects of interest 50 in a video feed are described in further detail elsewhere herein. Modules 220 can map coordinate data to object(s) of interest 50 during step S1-2 after each object is identified by reference to coordinate data field 234. In some cases, coordinates can be mapped to the objects being identified via the instrument for identifying objects. For example, in the case of a 3D camera, each object can be assigned coordinates based on corresponding position data obtained with camera(s) 102 and software for generating video feeds making up a 3D video feed. In some instances, assigning coordinates to objects of interest 50 can include generating a three-dimensional model of each object of interest 50 within a rendered simulation of environment 10.

In step S1-3, modules 220 of object estimation system 206 can estimate one or more measurements for object(s) of interest 50 identified in step S1-2. To estimate measurements for each object of interest 50, coordinate data for several points, regions, components, etc. for object(s) of interest 50 are compared with each other and other coordinate data assigned to a one or more video feeds. Modules 220, by referring to the coordinate data assigned to one or more video feeds, can derive several measurements including lengths, heights, depths, etc.

Estimation system 206 in step S1-4 can generate an inventory for a user, which summarizes each object of interest 50 identified in step S1-2. In an example embodiment, the inventory generated in step S1-4 can be in the form of a spreadsheet, with each row corresponding to a particular object of interest 50. The entry for each object of interest 50 in the created inventory can also include without limitation, coordinate data, estimated measurements, classifications, characteristics derived from coordinate data and/or estimated measurements, an indication of whether a user verified one or more items of information for each object of interest 50, and/or other information discussed herein which can be associated with a particular object of interest 50. The inventory generated in step S1-4 can be provided to a user and/or other party for review, and optionally can be manipulated by the user and/or other party to correct perceived errors, account for special circumstances, provide additional information, etc.

Process P1 can also include estimation system 206 calculating a metric, such as an estimated moving cost or an estimated amount of moving time, for each object of interest 50 of the inventory generated in step S1-4. Optionally, these calculated metrics can be included in the generated inventory, and/or may be presented separately as descriptive of all objects of interest 50 in environment 10. Although modules 220 can estimate both an estimated moving cost and an estimated moving time for objects of interest 50 in a single video feed, only one metric may be needed in some circumstances. Modules 220 with can determine, e.g., whether a user or other party has requested for only particular metrics (e.g., only a time or a cost) to be calculated.

Figure 4:
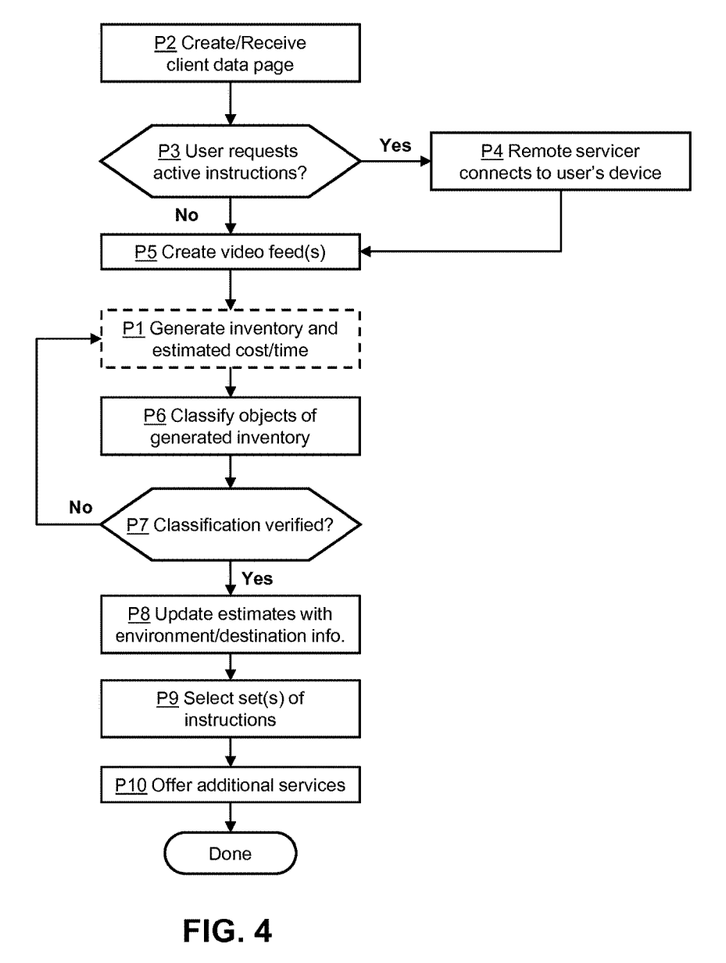

Referring now to FIGS. 2 and 4, additional process steps which can optionally be included in processes of the present disclosure are shown. Each additional step of FIG. 4 is shown as part of the same flow in a particular order as an illustrative example. It is understood that one or more process steps described herein may be omitted, or that the various optional process steps can be executed in a different order if desired.

The process steps S1-1 through S1-5 shown in FIG. 3 and discussed herein can be referred to generally as process P1 for generating an inventory of objects of interest 50 and providing an estimated metric, such as a moving cost or time, for objects of interest 50 of environment 10. In process P2, computer system 200 can create or receive a client data page for a particular user or customer. The client data page can include, e.g., a number of rooms within an environment 10 or a number of environments 10 with objects of interest 50 to be scanned for a cost and/or time estimate. The client data page can also include contact information (such as a name, address, phone number, etc.), GPS coordinates for the client's home and/or intended moving destination, a home type and/or home size, etc. Information from the client data page can be converted into data stored in memory 212 of computer system 200 and/or particular data fields. This data from the client data can be referred to throughout other process steps discussed herein in addition or as an alternative to other sources of data. Modules 220 can extract data from the client data page, e.g., by optical character recognition software (OCR), inputs provided with I/O device 215, reading dedicated files, and/or other currently known or later developed solutions for transmitting information from a particular file, document, or group of files and/or documents.

Embodiments of the present disclosure can include creating the video feed used in process P1 to generate an inventory and time/cost estimates. In process P3, communications module 240 of video device 100 and/or modules 220 of computer system 200 (through I/O interface 210) can ask a user whether he or she needs instructions on how or where to create a video feed of environment 10 with object(s) of interest 50 therein. In an embodiment, the user can request or decline instructions through an on-screen menu or prompt, a verbal prompt relayed from a servicer or other party, a voice and/or video call between a user and the servicer or other party, and/or any other currently known or later developed solution for querying a particular user. In the event that the user requests active instructions for creating the video feed(s) (i.e., "yes" at process P3), a remote servicer or other call can initiate a call or other connection to video device 100 and/or computer system 200 to provide additional instructions. In an embodiment, the servicer can communicate directly to the user (e.g., with a video call) in process P4 to request additional information and/or provide an instruction (e.g., a guided tutorial) for creating video feeds of environment 10. Communication between the remote servicer and the user in process P4 can be implemented wholly or partially with the aid of modules 220 and/or communications module 240. Where the user does not request instructions (i.e., "no" at process P3), the process flow can proceed to other steps without performing process P4. In any case, the user can create video feed(s) of environment 10 and object(s) of interest 50 in process P5 by using video device 100 and/or equivalent components of computer system 200. The video feeds processed in embodiments of the present disclosure can be captured in several ways, e.g., a user moving video device 100 through environment 10 in a particular pattern, at a particular speed, etc. One or more video feeds created in process P5, which may include corresponding coordinate data, can be an input to process P1 for generating an inventory and estimates of time and/or cost.

Following process P1, the method flow in embodiments of the present disclosure can optionally proceed to further processes to provide additional features. In process P6, modules 220 of estimation system 206 can classify object(s) of interest 50 of the generated inventory. For example, the inventory generated in process P1 can include three objects of interest 50 with corresponding dimensions. Modules 220, object recognition software of video device 100, and/or move preparation system 204 can classify each object of interest 50 based on predetermined criteria. For example, one set of predetermined criteria can include a "couch" being any object of interest 50 estimated to have a length dimension within a particular range, a height dimension within a particular range, a particular color or texture, a particular shape outline, etc. Where an object of interest 50 meets the criteria of a particular classification, this classification can be marked on the generated inventory and may be used to group detected objects of interest 50 with the same classifications together. Optionally, the estimate time and/or cost can be updated based on the classifications of objects of interest 50 of process P6.

In some cases, data 230 of estimation system 206 can include a library of objects with particular identifying features. Modules 220 can associate each identified object of interest 50 with some of these identifying features to classify and/or derive other estimated measurements of object of interest 50. In an example embodiment, modules 220 can identify one object of interest 50 as being a couch based on having particular length and height measurements, and can further estimate a total weight, size, density, etc. based on the original characteristics. If desired, modules 220 can transmit a query via I/O interface 210 to query a user as to whether the original classification and/or additional estimates are correct, or to ask the user to select between two or more potential classifications in the event that an object may match identifying characteristics for several items or categories.

In process P7, move preparation system 204 can request a user, servicer, and/or other party to verify the classification for each object of interest 50. In an embodiment, video device 100 and/or computing device 202 can prompt a user by visual and/or audio cues to confirm a preliminary inventory with measurements, classifications, estimated costs and/or moving times, etc. The verifying party (a user, servicer, etc.) can, e.g., indicate whether the classifications of the generated inventory are correct with microphone 104, I/O device 215, and/or other currently known or later developed methods for providing instructions to video device 100 and/or computer system 200. In the event that one or more classifications in the generated inventory are inaccurate (i.e., "No" at process P7) the flow can return to process P1 to modify or recalculate estimates and/or coordinate data based on any reported inaccuracies by the user, servicer, etc. Where the classifications of the generated inventory are verified as correct (i.e., "Yes" at process P7), the flow can continue to further steps.

In process P8, the calculated moving time and/or moving cost can be updated with either the location of environment 10 or a proposed destination to which object(s) of interest 50 will be moved. In an example embodiment, an estimated cost for moving object(s) of interest 50 from process P1 can be increased, decreased, etc. based on a number of miles between environment 10 and a proposed destination. In addition or alternatively, process P8 can be carried out at any time after process P1, e.g., after a destination has been changed or a previous customer with the same object(s) of interest 50 to be moved plans another move to another location.

In process P9, modules 220 of move preparation system 204 can select one or more sets of special instructions for moving objects of interest 50 in the generated inventory. In an example, each classification within a library of classifications applied in process P6 can correspond to special instructions, considerations, etc. For fragile or valuable objects of interest 50 such as artwork, electronic devices, etc., the corresponding entry within the generated inventory can be assigned an instruction, e.g., "handle with care," "to be moved by customer," "special packaging required," etc. The sets of instructions selected in process P9 can be specific to classifications of process P6, estimated measurements of process P1, and/or user specifications and inputs to video device 100 or computer system 200. The process flow can also include a process P10 for offering additional services to a user or other party. For example, where some objects of interest 50 or classifications provided in process P6 include expensive items, modules 220 of estimation system 206 can ask a user whether he or she would like to purchase insurance, request a specialized moving service, etc. This offer of additional services can be related to the classifications of process P6 if desired, and/or may be partially dependent on the sets of instructions selected in process P9. The offer of additional services to a user or other party in process P10 can provide additional value to some customers, and may not require a representative from the mover and/or provider of additional services to physically enter environment 10 to appraise the need for additional services.

Figure 5:
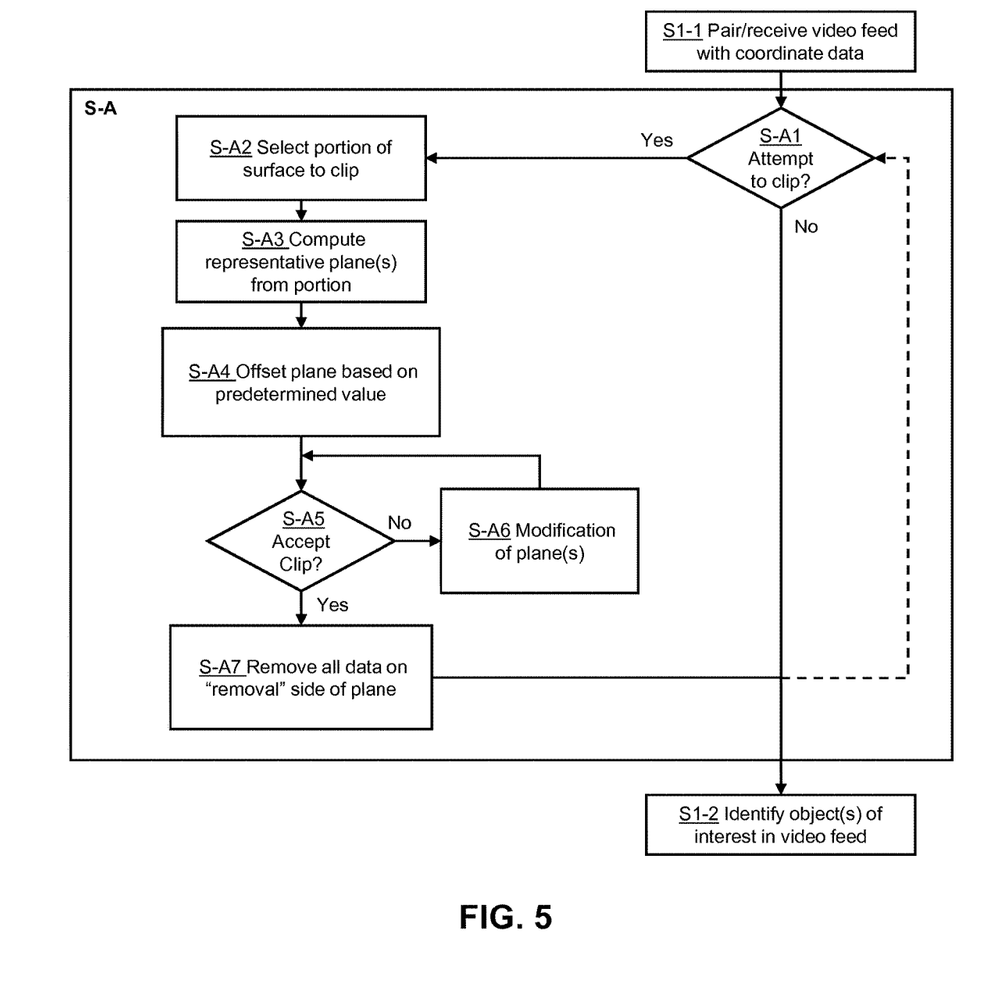

Turning to FIGS. 2 and 5, an optional process flow S-A according to embodiments of the present disclosure is shown. Process flow A can be performed as an intermediate step between steps S1-1 and S1-2, discussed herein, and/or can be carried out as a group of sub-steps integral to executing steps S1-1 and S1-2. Generally, process flow A can be provided to simplify the video feed data in which object(s) are identified in step S1-2, e.g., by "clipping" particular elements from a representation of environment 10. As used herein, the term "clipping" can refer to the act of isolating and removing elements within environment 10 which may impede the identification of objects of interest 50, e.g., walls, items with less than a threshold volume, shelves, etc. After pairing or receiving video feed data with coordinate data in step S1-1, a determinator of modules S-A1 can determine whether any portions of environment 10 can be clipped from the received video feed(s). The determination in step S-A1 can be performed by a user and/or automatically by modules 220, e.g., by performing a preliminary calculation of various sizes and/or reading coordinate data associated with video feed(s) from step S1-1. Where clipping is not attempted (e.g., "no" at step S-A1), the flow can proceed to step S1-2 of identifying object(s) of interest in the video feed as is described elsewhere herein.

Where some items will be clipped from the video feed (i.e., "yes" at step S-A1), the flow can proceed to step S-A2 of selecting a portion of a surface to be clipped. In an example embodiment, a user via I/O device 215 can use a tool such as a mouse, touch screen, etc., to highlight the surface of a wall or item to be clipped. At step S-A3, modules 220 can compute one or more representative planes for the item, thereby indicating an item to be clipped. More specifically, the representative planes can include a "removal" side from which modules 220 can identify features and/or items for removal in later steps of the process flow. At step S-A4, modules 220 can offset (i.e., move at least a portion of) the representative plane(s) by a particular value (e.g., by a calculated or user-determined amount of displacement along X, Y, Z coordinates, closer to a center point of environment 10 based on a surface normal) to account for surface features, protrusions, recesses, and/or other variations of an item.

At step S-A5, modules 220 can determine whether the selected item and/or portion thereof will be clipped. The determination can be fully automatic based on, e.g., the size of the plane being above and/or below threshold values, or by user confirmation through, e.g., I/O device 215. Where the clip is not accepted (i.e., "no" at step S-A5), the flow can proceed to step S-A6 in which modules 220 and/or user(s) can modify the selected plane(s) to better capture the particular item subject to clipping. Where the clip is accepted (i.e., "yes" at step S-A5), the flow can then proceed to step S-A7 of removing object and/or coordinate data on the removal side of the representative plane. Thereafter, the flow can proceed to step S1-2 of identifying objects of interest 50 which have not been clipped, or can return to step S-A1 of determining whether to clip another item.

Figure 6:
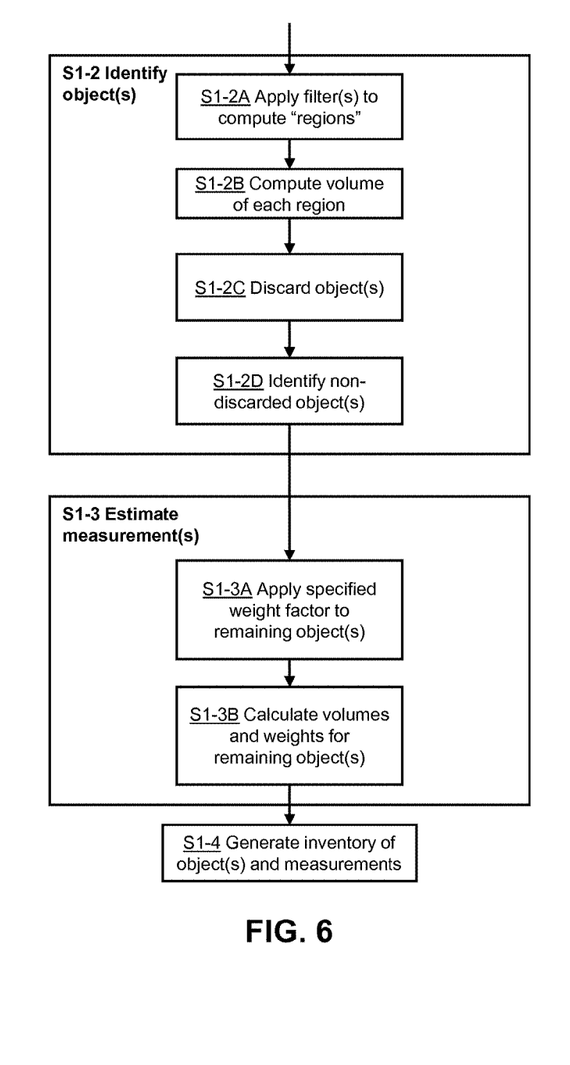

Referring now to FIGS. 2 and 6, example sub-process flows for steps S1-2 and S1-3 are shown. In particular, step S1-2 can include sub-steps S1-2A, S1-2B, S1-2C, and/or S1-2D where applicable, while step S1-3 can be subdivided into steps S1-3A and S1-3B. It is understood that the sub-steps shown in FIG. 6 can be executed together and/or separately in embodiments of the present disclosure, and that other techniques for carrying out steps S1-2 and/or S1-3 can also be performed. In step S1-2, a sub-process flow can include step S1-2A of applying one or more filter(s) to the video feed from step S1-1. Modules 220 can apply various filters to split environment 10 into multiple smaller environments 10, referred to herein as "regions." Each region can include, e.g., a number of items or polygons (in the case of a simulated rendering of environment 10) within a predefined maximum number. The regions defined in step S1-2A can optionally be sorted automatically with modules 220 or from user inputs based on one or more criteria, e.g., size, number of objects of interest 50, types of objects of interest 50 included therein, etc. A user can also manually define a filter (e.g., by drawing a desired region using I/O device 215) to define environment(s) 10. Regardless of whether regions are defined in step S1-2A, step S1-2 can include computing or estimating a total volume of each region (or environment 10) based on, e.g., the number of polygons and/or other methods for estimating objects within environment 10. To further simply environment 10 beyond what is provided in process flow A (FIG. 5), modules 220 can automatically discard (i.e., remove) some objects of interest 50 from the representation of environment 10. The discarding in step S1-2C can be based on, e.g., a size of particular items or objects of interest 50 being below a threshold size, which in turn can be stored as a type of data 230. Modules 220 can then identify any non-discarded objects in step S1-2D pursuant to the methods described elsewhere herein. Optionally, where no objects are discarded from the simulated environment 10 in step S1-2C, the flow can proceed for each environment 10 or region pursuant to the process flows described elsewhere herein.

Referring to step S1-3, embodiments of the present disclosure can also include specific processes for estimating the measurements of one or more objects of interest 50 within environment 10. For example, object library field 236 and/or other portions of data 230 can include one or more weighting factors for some objects of interest 50. For example, a weighting factor can include a density measurement such as pounds per cubic centimeter or other expression of weight or mass per volume. The weighting factor applied in step S1-3A can be previously calculated by modules 220 and/or can be calculated by a particular user and submitted via I/O device 215. Where the relationship between size and weight for a particular object is unknown, one or more default weighting factors can be applied to some objects of interest 50 in step S1-3A. After selecting and/or applying weighting factors in step S1-3B, modules 220 with calculating functions can then calculate both volumes and weights for each object of interest 50 in environment 10 as is described elsewhere herein. Within step S1-3B, total estimates of volume and/or weight, including volume/weight estimates for individual regions (e.g., multiple environments 10) can be independently calculated and/or summed. Thereafter, the flow can proceed to step S1-4 of generating an inventory of objects of interest 50 within environment 10.

Following all or some of the processes discussed herein, the method can conclude. Technical effects of the method discussed herein include the ability for each object of interest in an environment to be recognized and estimated for size and moving costs without representatives of a moving company or other party needing to physically enter an environment. An additional technical effect is to generate inventory listings of each object of interest in the environment with an organized list of associated properties without a human viewing the original video feed(s) from which estimated measurements and properties are extracted. Furthermore, this automatic conversion of one or more video feeds into an inventory with estimated measurements and properties can allow additional service offers, object classifications, and/or special moving instructions to be communicated automatically to particular customers or groups of customers. In an example deployment setting, a customer desiring to move furniture from one location to another can download an application onto a video device (e.g., a smart phone, tablet, wearable or non-wearable computer, etc.), create one or more video feeds which include objects to be moved, and submit the video feeds for conversion into the inventory and various estimations discussed herein. In this same deployment setting, a moving company with offices at a remote location can receive the one or more video feeds and prepare for an upcoming task without physically entering the customer's home.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating an estimated moving cost and an estimated moving time for at least one object of interest in an environment, the method comprising:

capturing a video feed of the environment using a 3D camera configured to view the environment, wherein the 3D camera is configured to record the video feed with coordinate data for three dimensions of space, the coordinate data being assigned to the video feed;

identifying the at least one object of interest from the video feed of the environment, wherein the video feed includes the coordinate data for three dimensions of space, the coordinate data being assigned to the video feed, the identifying including processing the video feed of the environment with a computing device in communication with the 3D camera, wherein the computing device performs actions including:

identifying a portion of a surface within the environment as a clipping boundary, the portion of the surface being part of an element to be removed from the video feed,         computing a representative plane based on the identified portion of the surface, wherein the representative plane includes a removal side situated on a first side of the surface, and a non-removal side situated on a second side of the surface,         moving a position of the representative plane by a predetermined spatial coordinate value to output a displaced representative plane, wherein moving the position of the representative plane increases an overlap of the removal side of the representative plane on the portion of the surface,         removing the identified portion of the surface adjoining the removal side of the displaced representative plane from the video feed, and         outputting a modified video feed of the environment, wherein the removed portion of the surface is absent from the modified video feed;

estimating, via the computing device, a plurality of measurements of the at least one object of interest from the coordinate data and the modified video feed of the environment, wherein the plurality of measurements includes dimensional information for the at least one object;

generating, via the computing device, an inventory of each identified object of interest in the modified video feed and corresponding plurality of measurements;

classifying, via the computing device, the at least one object of interest by assigning an object type to each object of interest, wherein the classifying includes:

comparing the dimensional information for each object of interest with a library having a plurality of dimensional ranges, each of the plurality of dimensional ranges corresponding to one of a plurality of object types, and assigning one of the plurality of object types in the library to each object of interest based on the dimensional information of the object of interest being within one of the plurality of dimensional ranges; and calculating, via the computing device, the estimated moving time and the estimated moving cost based on the generated inventory and a look up table, wherein the estimated moving time and estimated moving cost pertain to removing the at least one object of interest from the environment, or moving the at least one object of interest to a proposed destination.

2. The method of claim 1, further comprising verifying the estimated plurality of measurements in response to a voice input to the 3D camera.

3. The method of claim 1, wherein the coordinate data is derived from one of a three-dimensional simulation of the environment, the video feed of the 3D camera, and applying an image recognition algorithm to the video feed of the environment.

4. The method of claim 1, further placing a call to the user to provide an instruction for recording the video feed with the 3D camera.

5. The method of claim 1, wherein one of the estimated moving time and the estimated moving cost is further based on a location of the environment and the proposed destination.

6. The method of claim 1, further comprising one of:
prompting the user, via the computing device, to verify the classified object of interest;
identifying an additional service with the computing device based on the classified object of interest; and
offering an additional service, via the computing device, to the user based on the plurality of measurements.

7. The method of claim 1, further comprising automatically selecting a set of instructions for moving the at least one object of interest via the computing device, based on one of the plurality of measurements and the modified video feed of the environment.

8. The method of claim 1, wherein the plurality of measurements comprise vector-format measurements.

9. The method of claim 1, wherein the identifying of the at least one object of interest from the modified video feed of an environment via the computing device further includes:
defining a region within the environment;
computing a volume of a plurality of objects within the region;
defining a threshold volume;
discarding at least one of the plurality of objects within the region having a volume less than the threshold volume; and
defining at least one of the plurality of objects within the region having a volume at least equal to the threshold volume as the at least one object of interest.

10. A program product stored on a non-transitory computer-readable medium, the program product being operative to automatically generate an estimated moving cost and an estimated moving time for at least one object of interest in an environment when executed and comprising program code for causing a computer system to:
cause a 3D camera communicatively coupled to the computer system, and configured to view the environment, to capture a video feed of the environment, wherein the 3D camera is further configured to record the video feed with coordinate data for three dimensions of space, the coordinate data being assigned to the video feed;
identify the at least one object of interest from the video feed of the environment, wherein the video feed includes the coordinate data for three dimensions of space, the coordinate data being assigned to the video feed, the identifying including processing the video feed of the environment with the computer system by performing actions including:
identifying a portion of a surface within the environment as a clipping boundary, the portion of the surface being part of an element to be removed from the video feed,
computing a representative plane based on the identified portion of the surface, wherein the representative plane includes a removal side situated on a first side of the surface, and a non-removal side situated on a second side of the surface,
moving a position of the representative plane by a predetermined spatial coordinate value to output a displaced representative plane, wherein moving the position of the representative plane increases an overlap of the removal side of the representative plane on the portion of the surface,
removing the identified portion of the surface adjoining the removal side of the displaced representative plane from the video feed, and
outputting a modified video feed of the environment, wherein the removed portion of the surface is absent from the modified video feed;
estimate, via the computer system, a plurality of measurements of the at least one object of interest from the coordinate data and the modified video feed of the environment, wherein the plurality of measurements includes dimensional information for the at least one object;
generate, via the computer system, an inventory of each identified object of interest and corresponding plurality of measurements;
classify, via the computer system, the at least one object of interest by assigning an object type to each object of interest, wherein the classifying includes:
comparing the dimensional information for each object of interest with a library having a plurality of dimensional ranges, each of the plurality of dimensional ranges corresponding to one of a plurality of object types, and
assigning one of the plurality of object types in the library to each object of interest based on the dimensional information of the object of interest being within one of the plurality of dimensional ranges;
and calculate, via the computer system, the estimated moving time and the estimated moving cost based on the generated inventory and a look up table, wherein the estimated moving time and estimated moving cost pertain to removing the at least one object of interest from the environment, or moving the at least one object of interest to a proposed destination.

11. The program product of claim 10, further comprising program code for causing the computer system to verify the estimated plurality of measurements in response to a voice input to the 3D camera.

12. The program product of claim 10, wherein the coordinate data is derived from one of a three-dimensional simulation of the environment, the video feed of the 3D camera, and applying an image recognition algorithm to the video feed of the environment.

13. The program product of claim 10, further comprising program code for causing the computer system to place a call to a remote user to provide an instruction for recording the video feed with the 3D camera.

14. The program product of claim 10, wherein the plurality of measurements includes one of a volume, a density, and a weight of the at least one object of interest.

15. The program product of claim 10, wherein one of the estimated moving time and the estimated moving cost is further based on a location of the environment and the proposed destination.

16. The program product of claim 15, wherein the location of the environment is obtained from GPS data of the computer system, or the 3D camera for recording the video feed of the environment.

17. The program product of claim 10, further comprising program code for causing the computer system to:
prompt the user, via the computer system, to verify the classified object of interest;
identify, via the computer system, an additional service based on the classified object of interest; and
offer an additional service, via the computer system, to the user based on the plurality of measurements.

18. The computer program product of claim 10, further comprising program code for causing the computer system to:
define a region within the environment;
compute a volume of a plurality of objects within the region;
define a threshold volume;
discard at least one of the plurality of objects within the region having a volume less than the threshold volume; and
define at least one of the plurality of objects within the region having a volume at least equal to the threshold volume as the at least one object of interest.

19. A system for automatically generating an estimated moving cost and an estimated moving time for at least one object of interest in an environment, the system comprising:
a 3D camera configured to view the environment and capture a video feed of the environment, wherein the 3D camera is configured to record the video feed with coordinate data for three dimensions of space, the coordinate data being assigned to the video feed;
at least one computing device in communication with the 3D camera, the at least one computing device including:
an identifier for identifying at least one object of interest from a video feed of an environment, wherein the video feed includes the coordinate data for three dimensions of space, the coordinate data being assigned to the video feed, the identifying including processing the video feed of the environment by performing actions including:
identifying a portion of a surface within the environment as a clipping boundary, the portion of the surface being part of an element to be removed from the video feed,
computing a representative plane based on the identified portion of the surface, wherein the representative plane includes a removal side situated on a first side of the surface, and a non-removal side situated on a second side of the surface,
moving a position of the representative plane by a predetermined spatial coordinate value to output a displaced representative plane, wherein moving the position of the representative plane increases an overlap of the removal side of the representative plane on the portion of the surface,
removing the identified portion of the surface adjoining the removal side of the displaced representative plane from the video feed, and
outputting a modified video feed of the environment, wherein the removed portion of the surface is absent from the modified video feed;
a data processing module for estimating a plurality of measurements of the at least one object of interest from the coordinate data and the modified video feed of the environment, wherein the plurality of measurements includes dimensional information for the at least one object, generating an inventory of each identified object of interest and corresponding plurality of measurements, and classifying the at least one object of interest by assigning an object type to each object of interest, wherein the classifying includes:
comparing the dimensional information for each object of interest with a library having a plurality of dimensional ranges, each of the plurality of dimensional ranges corresponding to one of a plurality of object types, and
assigning one of the plurality of object types in the library to each object of interest based on the dimensional information of the object of interest being within one of the plurality of dimensional ranges; and
a calculator for calculating the estimated moving time and the estimated moving cost based on the generated inventory and a look up table, wherein the estimated moving time and estimated moving cost pertain to removing the at least one object of interest from the environment, or moving the at least one object of interest to a proposed destination.

* * * * *